United States Patent [19]  [11] 3,864,216
Worrell et al.  [45] Feb. 4, 1975

[54] TERTIARY BUTYL HYDROPEROXIDE PURIFICATION BY DISTILLATION AT ATMOSPHERIC PRESSURE WITH AN INERT DILUENT GAS

[75] Inventors: George R. Worrell, Media, Pa.; Edward G. Guetens, Glendora, N.J.; James T. O'Toole, Philadelphia, Pa.

[73] Assignee: Atlantic Richfield Company, New York, N.Y.

[22] Filed: Nov. 6, 1972

[21] Appl. No.: 304,278

Related U.S. Application Data

[63] Continuation-in-part of Ser. No. 68,907, Sept. 2, 1970, abandoned.

[52] U.S. Cl. ............ 203/49, 203/50, 260/610 A
[51] Int. Cl. ............................................ B01d 3/34
[58] Field of Search ............ 203/49, 95, 96, 97, 76, 203/79, 83, 85, 68, 50; 260/610 A, 610 B, 610 R, 621 A

[56] References Cited
UNITED STATES PATENTS

| | | | |
|---|---|---|---|
| 2,383,919 | 8/1945 | Rust | 260/610 A |
| 2,845,461 | 7/1958 | Winkler et al. | 260/610 |
| 3,427,229 | 2/1969 | Herzog | 203/63 |
| 3,449,217 | 6/1969 | Harvey | 203/6 |
| 3,478,108 | 11/1969 | Grane | 260/610 B |

FOREIGN PATENTS OR APPLICATIONS 927,090  5/1963  England .................. 260/621 A Primary Examiner—A. Louis Monacell
Assistant Examiner—Frank Sever
Attorney, Agent, or Firm—Delbert E. McCaslin

[57] ABSTRACT

In the purification of tertiary butyl hydroperoxide from an isobutane oxidate mixture by the use of water in an atmospheric pressure distillation process the formation of flammable vapor phase tertiary butyl hydroperoxide-water mixtures is avoided by diluting such mixtures with a non-soluble, non-condensing gas, such as methane, ethane, ethylene, carbon monoxide, nitrogen or argon.

3 Claims, 1 Drawing Figure

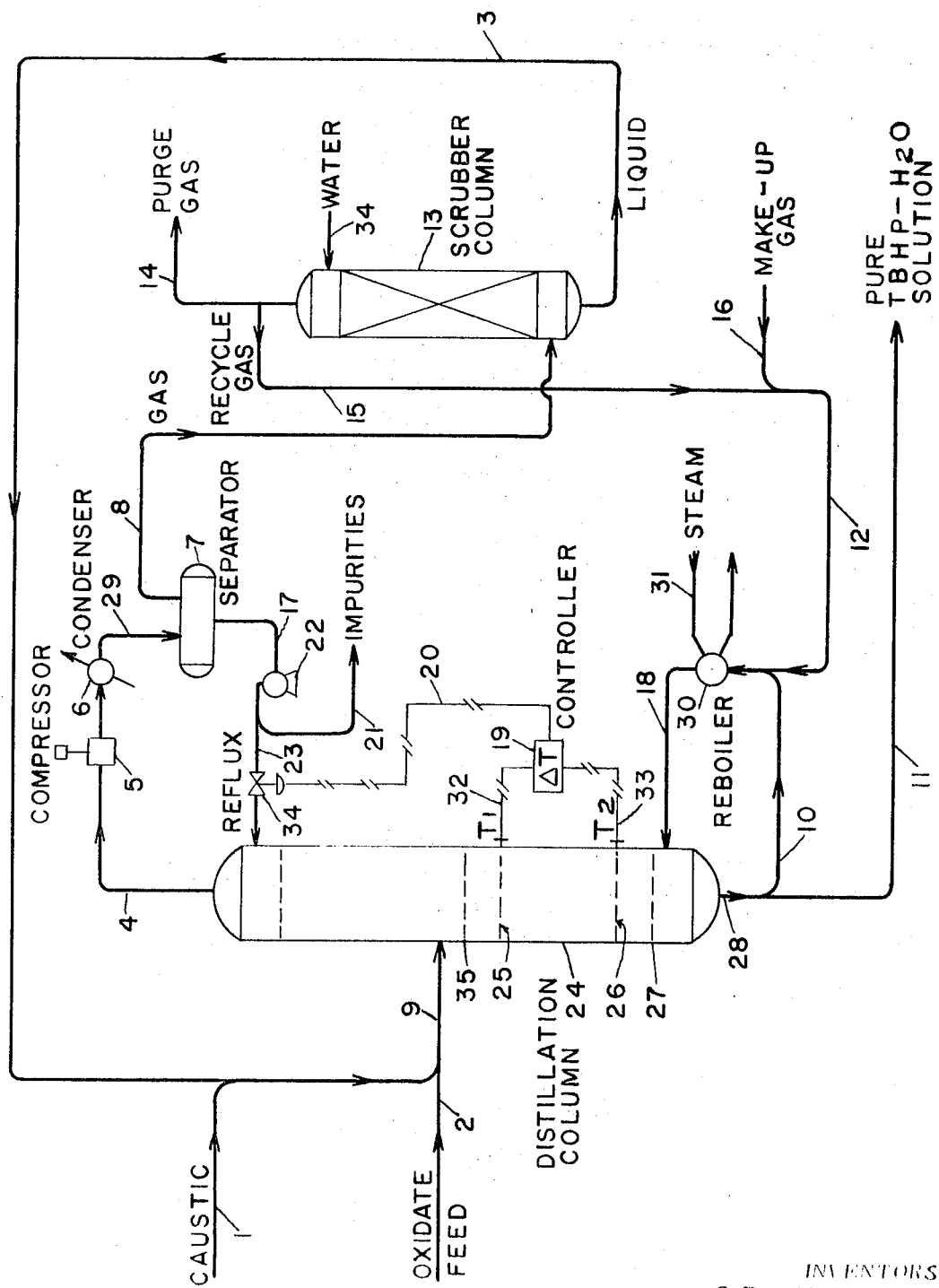

TERTIARY BUTYL HYDROPEROXIDE PURIFICATION BY DISTILLATION AT ATMOSPHERIC PRESSURE WITH AN INERT DILUENT GAS

CROSS REFERENCE TO RELATED APPLICATION

This application is a continuation-in-part of our copending application Ser. No. 68,907, filed Sept. 2, 1970, entitled TERTIARY BUTYL HYDROPEROXIDE PURIFICATION BY DISTILLATION AT ATMOSPHERIC PRESSURE now abandoned.

BACKGROUND OF THE INVENTION

This invention relates to the purification of tertiary butyl hydroperoxide contained in the oxidate mixture obtained by the liquid phase oxidation of isobutane with molecular oxygen. Such oxidate after removal of the unreacted isobutane contains tertiary butyl hydroperoxide, tertiary butyl alcohol, and small amounts of water, acetone, organic acids, esters, peroxides and the like. It is advantageous to recover the tertiary butyl hydroperoxide from such oxidate mixtures in the highest possible yield at maximum purity by the use of atmospheric pressure distillation while avoiding flammable mixtures in the distillation column.

The liquid phase oxidation of isobutane with molecular oxygen to produce predominantly tertiary butyl hydroperoxidetertiary butyl alcohol mixtures is shown in U.S. Pat. No. 2,845,461 to Winkler et al. In general about equimolar mixtures of the tertiary butyl hydroperoxide and the tertiary butyl alcohol are produced, however, this proportion can be varied somewhat by the degree of conversion of the isobutane. In a typical example, after the unreacted isobutane has been flashed from the isobutane oxidate mixture, the resulting oxidate contains about 42 weight per cent tertiary butyl hydroperoxide, 53 weight per cent tertiary butyl alcohol, 1 weight per cent water, 1 weight per cent acetone, 1 weight per cent formic acid, 1 weight per cent other peroxide compounds and 1 weight per cent other components, such as alcohols, esters and the like. In general there is no compound boiling below about 100° F. in such oxidate mixtures.

In U.S. Pat. No. 3,449,217 (1969) to Harvey a process is shown which attempts to avoid the decomposition problem associated with flammable mixtures in the distillation of isobutane oxidates. This patent shows neutralization of the oxidate with base and thereafter distilling in the presence of a diluent vapor, preferably steam, in order to avoid problems of explosive decomposition, recovering tertiary butyl alcohol-water azeotrope and tertiary butyl hydroperoxide-waer azeotrope as overheads, further stating that "although atmospheric pressures can be employed during the distillation it is exceedingly advantageous that the distillation be conducted under conditions of reduced pressure." As will be shown herein, Harvey's atmospheric pressure embodiment entails vapors in the explosive range; in fact, pressures as low as 100 mm Hg would be necessary to avoid flammability in the Harvey process.

Other patents such as U.S. Pat. No. 3,427,229 (1969) to Herzog shows recovery of tertiary butyl hydroperoxide from the vapor phase resulting from a liquid phase epoxidation reaction; this vapor phase containing an olefin and tertiary butyl alcohol. The tertiary butyl hydroperoxide is recovered as a bottoms stream in a distillation process utilizing a reflux agent.

The process of the instant invention avoids the disadvantages of the prior art processes in that it permits purification of tertiary butyl hydroperoxide from isobutane oxidate streams by distillation with water at atmospheric pressures while at the same time avoiding the inherent danger of forming flammable tertiary butyl hydroperoxide-water vapor mixtures. This is accomplished by injecting a non-soluble, non-condensing gas into the bottom of the distillation column in order to dilute the vapors throughout the column as will be described more fully hereinafter.

It is an object of this invention therefore to purify tertiary butyl hydroperoxide from isobutane oxidate mixtures by distillation at atmospheric pressures and without the formation of flammable vapor mixtures.

It is another object of this invention to fractionally distill mixtures of tertiary butyl hydroperoxide, tertiary butyl alcohol, esters, acids, ketones and other oxidation compounds and water at atmospheric pressure while avoiding explosive or flammable vapor mixtures in the system.

Other objects of this invention will be apparent from the description of the invention which follows and from the claims.

SUMMARY OF THE INVENTION

It has been found that tertiary butyl hydroperoxide can be fractionally distilled safely from isobutane oxidate mixtures at atmospheric pressure by neutralizing the oxidate with base, adding water and introducing a sufficient quantity of a diluent gas to maintain the specific percentage of such gas throughout the vapor phase of the distillation column during the distillation process. The diluent gas is selected from the group consisting of methane, ethane, ethylene, carbon monoxide, nitrogen and argon all of which gases are further characterized by being non-soluble and non-condensing in the distillation system.

BRIEF DESCRIPTION OF THE DRAWING

The FIGURE is a schematic diagram of a specific flow system which can be used to carry out the process of this invention.

DESCRIPTION OF THE PREFERRED EMBODIMENTS AND DETAILED DESCRIPTION OF THE DRAWING

The isobutane oxidate employed in the process of this invention is produced by the liquid phase oxidation of isobutane with molecular oxygen in accordance with well known commercial methods, in general such methods are similar to that described in the aforementioned patent to Winkler et al. The effluent from the isobutane oxidizer after the unreacted isobutane has been stripped therefrom can consist of approximately equimolar quantities of tertiary butyl hydroperoxide and tertiary butyl alcohol. Depending upon the conditions employed in the oxidizer and the degree of conversion of the isobutane the selectivity for the production of tertiary butyl hydroperoxide can vary from about 40 weight per cent to 65 weight per cent with the tertiary butyl alcohol being correspondingly about 55 weight per cent to 30 weight per cent with the by-products amounting to about 5 weight per cent. These by-products generally are about 1 weight per cent water, 1 weight per cent acetone, 1 weight percent formic acid, 1 weight per cent other peroxide compounds, and 1 weight per cent other oxidized components. Although in some instances the total amount of by-products may be somewhat greater than 5 per cent, for example, of the order of 8 per cent, the distribution ratios of the various by-products are about the same.

In order to describe the invention in greater detail reference is made to the drawing wherein the isobutane oxidate having the composition as described above is the feed in line 2. Enough base is added through line 1 to the feed in line 2 to neutralize the acidic components in the feed and the mixture is passed through line 9 to a distillation column 24 which is maintained preferably at about atmospheric pressure. Water 3 is added as a diluent along with the base according to the method of Harvey, supra, the amount of water being preferably sufficient to give a water to tertiary butyl hydroperoxide ratio of at least 5:1 by weight.

We have found that the tertiary butyl hydroperoxide-water vapor azeotrope contains about 20 volume per cent (55 weight per cent) tertiary butyl hydroperoxide and is flammable at atmospheric pressure as well as at reduced pressures as low as 200 mm Hg absolute. Although this vapor azeotrope can occur at various levels in the column depending upon the operation of the column, in general, since the column is operated to remove the tertiary butyl hydroperoxide as a bottoms fraction and the tertiary butyl alcohol and other oxidation products as overheads, the tertiary butyl hydroperoxide-water vapor azeotrope is most frequently near the bottom of the column. Accordingly, since it is an object of our invention to avoid the presence of flammable vapor at any point in the distillation column with the attendant danger of ignition and sudden pressure rise, we add a non-condensable, non-soluble gas through line 16 which is introduced into the distillation column via lines 12 and 18 at a point near the bottom of the column, thus insuring that this diluent gas will always dilute the flammable vapor azeotrope. This diluent gas which is non-condensable and non-soluble may be methane, ethane, ethylene, carbon monoxide, nitrogen or argon and introduced in an amount such that the resultant vapor mixture throughout the column is outside the flammable range. Thus the tertiary butyl hydroperoxide-water vapor azeotrope as well as all mixtures of tertiary butyl hydroperoxide-water vapor is diluted with sufficient inert gas so that the vapor phase contains volume percentages of tertiary butyl hydroperoxide outside the flammable range. At atmospheric pressure, using methane for example, as the diluent, the volume per cent of tertiary butyl hydroperoxide must be reduced to less than 7.5 volume per cent to avoid a flammable vapor mixture. Using nitrogen, tertiary butyl hydroperoxide must comprise less than 4 volume per cent to avoid a flammable vapor mixture. Therefore in order to achieve these desired percentages when the diluent selected is methane or nitrogen the vapor phase must comprise 60 volume per cent methane or 80 volume per cent nitrogen with the remainder of the vapor phase being the tertiary butyl hydroperoxide-water vapor azeotrope or mixtures of the tertiary butyl hydroperoxide, water vapor and other constituents of the oxidate.

Contrary to the conclusions of the prior art, we have found that water vapor alone is not a suitable diluent gas because there is no way to avoid the formation of the flammable tertiary butyl hydroperoxide-water vapor azeotrope at some location within the distillation column. However, in order to separate other oxidation products in the isobutane oxidate from the tertiary butyl hydroperoxide we have found that it is desirable to add water to the isobutane oxidate prior to distillation, then in accordance with this invention by adding the second inert gaseous diluent the vapor in the distillation column is a mixture comprising tertiary butyl hydroperoxide, water vapor, and the inert diluent gas selected from the group consisting of methane, ethane, ethylene, carbon monoxide, nitrogen and argon.

The preferred diluent gases are methane or nitrogen due to their availability. Most preferred is methane because only 60 volume per cent is necessary in the vapor to avoid flammability, whereas when nitrogen is employed 80 volume per cent is necessary to avoid flammability at atmospheric pressure.

The purified tertiary butyl hydroperoxide-water is taken from the bottom 28 of the distillation column 24 via line 11, circulating a portion through the reboiler 30 via line 10 and return line 18, adding diluent gas at this point via line 12 which consists mostly of recycle gas 15 and partially of make-up gas 16 to replace the small amount of gas purged via line 14 as a means of expelling oxygen from the system which is incurred due to decomposition of tertiary butyl hydroperoxide.

The impurities are taken away via line 21 controlled by pump 22 fed by line 17 off from the bottom of separator 7 which functions to separate the gas from entrained condensable impurities as it leaves the top of the column 24 at 4 after it is compressed 5 and condensed 6 and thence passed 29 to separator 7, and scrubber column 13 via line 8 wherein it is scrubbed with water 34 prior to passing via line 15, etc., back to the distillation column. The water mixed with absorbed diluent gas is passed via line 3, etc. back to the oxidate feed line.

The tertiary butyl hydroperoxide-water solution exiting at 11 is preferably passed to a second distillation column and separated thereafter by conventional means as per the Harvey, supra, process.

The process of this invention is preferably carried out employing a differential temperature controller at the distillation column as hereinafter described.

A differential temperature controller 19 is connected at two points 25 and 26 in the column and is used to manipulate the flow of reflux at 34 by means of a signal transmitted via electrical line 20. The temperature is measured at levels 25 and 26 and transmitted via electrical lines 32 and 33 respectively to the controller which opens or closes the reflux valve to maintain a constant differential temperature. The use of an ordinary temperature controller would be unsuitable because the partial pressure of the condensable vapors could easily vary and change the temperature without any change in concentrations of impurities. The controlling end 32 is preferably located just below the feed tray 35 at 25 and the fixed composition end 33 is located preferably about four trays above the bottom tray 27 of the column at 26, said location 26 chosen to fix the temperature of the tertiary butyl hydroperoxide-water azeotrope containing 20 mole per cent tertiary butyl hydroperoxide in the vapor, regardless of the tertiary butyl hydroperoxide concentration in the product leaving the bottom of the column. Since both measurement points vary together as partial pressure varies, the problems of varying partial pressure effects on temperature control are eliminated.

Atmospheric pressure is preferred, although reduced pressures would also be operable; however, the purpose of the diluent gas is to eliminate the necessity for greatly reduced pressures in order to avoid the flammable range in the vapor phase. Even at pressures as low as 200 mm Hg it is impossible to avoid tertiary butyl hydroperoxide-water azeotropes at some point in the distillation column which are flammable or explosive without the use of the inert diluent gas of the invention. The term inert gas in this invention excludes water vapor.

Operation at atmospheric pressure rather than reduced pressure has certain important advantages per se, above those already mentioned. With vacuum pressure, there is the hazard of oxygen leaking into the column. This hazard is eliminated by atmospheric pressure distillation.

The most preferred pressure measured at the compressor section is atmospheric, as previously mentioned, but 14.7 to 20 psia is the preferred range, even though higher and lower pressures are considered operable.

The differential temperature controller may be used to regulate other variables than the top reflux; for example, the flow of steam to the reboiler, the flow of water and oxygenated compounds from the scrubber, and flow of fresh oxidate feed to the column, but are less preferred than is regulation of the top reflux.

Either batch or continuous distillation may be employed in the process of this invention.

The distillation may be carried out in any conventional distillation column which is adaptable for inert gas circulation at atmospheric pressure. The preferred column is a column with multiple trays being fed at a location near the middle, a conventional reboiler at the bottom, and bottoms and overheads exit points as well as provision for temperature control probes at two points, most preferably about two trays below the feed tray and four trays above the lowest tray.

The inert gas is most economically recycled and scrubbed using the described apparatus, however, the inert gas may be used once through and disposed of within the concepts of this invention.

The following examples are presented to illustrate the invention but are in no way limiting.

EXAMPLE I

The following data show that at pressures higher than 100 mm Hg, the normal tertiary butyl hydroperoxide-water azeotrope is flammable. The data are the result of the experiments showing the maximum allowable mole per cent, i.e., volume per cent, of tertiary butyl hydroperoxide in tertiary butyl hydroperoxide-water vapor mixtures to avoid flammability.

| Absolute Pressure, mm Hg | 100 | 200 | 760 |
|---|---|---|---|
| mole % (vol. %) TBHP*, maximum | 25 | 14 | 17 |
| mole % (vol. %) H₂O, remainder of mixture | 75 | 86 | 83 |

* TBHP = tertiary butyl hydroperoxide.

Thus, it is readily apparent that between 200 and 760 mm Hg pressures, the azeotrope of tertiary butyl hydroperoxide and water (containing 20 mole per cent, i.e., volume per cent, tertiary butyl hydroperoxide) is flammable in the vapor phase.

EXAMPLE II

The following data result from experiments to determine the maximum tertiary butyl hydroperoxide concentration outside flammability range in a ternary vapor mixture of tertiary butyl hydroperoxide, water and methane at atmospheric pressure.

| | |
|---|---|
| mole % (vol. %) TBHP | 7.5 |
| mole % (vol. %) H₂O | 32.5 |
| mole % (vol. %) CH₄ | 60.0 |

The tertiary butyl hydroperoxide/water ratio was chosen to approximate the azeotropic tertiary butyl hydroperoxide/water ratio.

EXAMPLE III

The following show the corresponding data for nitrogen diluent at atmospheric pressure.

| | |
|---|---|
| mole % (vol. %) TBHP | 4 |
| mole % (vol. %) H₂O | 16 |
| mole % (vol. %) N₂ | 80 |

EXAMPLE IV

An isobutane oxidate mixture containing 42 per cent tertiary butyl hydroperoxide, 53 per cent tertiary butyl alcohol, and 5 per cent other oxidation products comprising about 1 weight per cent water, 1 weight per cent acetone, 1 weight per cent formic acid, 1 weight per cent other peroxide compounds and 1 weight per cent other oxidation products such as esters and the like was passed to a 40 plate continuous distillation apparatus maintained at about atmospheric pressure along with enough caustic to neutralize the oxidate mixture and water in the weight ratio of 4.8:1 of water to oxidate. The column was maintained at a bottom temperature of about 170° F. and methane was maintained in the vapor phase at a volume or mole per cent of 65 per cent of the vapor.

A tertiary butyl hydroperoxide-water-methane bottoms product essentially free of tertiary butyl alcohol and other undesired oxidation products containing 8 weight per cent tertiary butyl hydroperoxide was passed to a second column where the tertiary butyl hydroperoxide concentration in water was increased to 70 weight per cent.

While various specific embodiments have been presented, we do intend to cover all alternatives, modifications and substitutions thereof which should be obvious to those skilled in the art.

We claim:

1. In a process for the purification and recovery of tertiary butyl hydroperoxide from an isobutane-free isobutane oxidate wherein said oxidate is fractionally distilled at about atmospheric pressure in a columnar distillation zone in the presence of water vapor, said water vapor being produced by the vaporization in said distillation zone of water introduced into said distillation zone together with said oxidate at a point in the mid-section of said distillation zone, the weight ratio of said water to the tertiary butyl hydroperoxide in said oxidate being at least 5:1, the improvement comprising introducing a non-soluble, non-condensing diluent gas selected from the group consisting of methane and nitrogen at a point near the bottom of said distillation zone to dilute vapors formed in said zone and in an amount such that flamable tertiary butyl hydroperoxide-water vapor mixtures are avoided throughout said distillation zone, said methane being maintained in a proportion of at least 60 per cent by volume in the vapor phase, said nitrogen being maintained in a proportion of at least 80 per cent by volume in the vapor phase, removing from the bottom of said columnar distillation zone a bottoms fraction of purified tertiary butyl hydroperoxide and water and removing from the top of said columnar distillation zone an overhead comprising the oxidate impurities and said diluent gas.

2. The method according to claim 1 wherein said diluent gas is methane.

3. The method according to claim 1 wherein said diluent gas is nitrogen.

* * * * *